United States Patent
Ali et al.

(10) Patent No.: US 12,127,013 B2
(45) Date of Patent: Oct. 22, 2024

(54) CONFIGURATION CORRESPONDING TO A RECONFIGURABLE INTELLIGENT SURFACE CONTROLLER

(71) Applicant: Lenovo (Singapore) Pte. Ltd., New Tech Park (SG)

(72) Inventors: Ali Ramadan Ali, Munich (DE); Robin Thomas, Frankfurt am Main (DE); Karthikeyan Ganesan, Kronberg im Taunus (DE); Abir Ben Hadj Fredj, Frankfurt am main (DE)

(73) Assignee: Lenovo (Singapore) Pte. Ltd., New Tech Park (SG)

( * ) Notice: Subject to any disclaimer, the term of this patent is extended or adjusted under 35 U.S.C. 154(b) by 378 days.

(21) Appl. No.: 17/548,252

(22) Filed: Dec. 10, 2021

(65) Prior Publication Data

US 2023/0189021 A1 Jun. 15, 2023

(51) Int. Cl.
*H04W 72/04* (2023.01)
*G01S 5/16* (2006.01)
(Continued)

(52) U.S. Cl.
CPC ............ *H04W 24/02* (2013.01); *G01S 5/16* (2013.01); *H04W 4/023* (2013.01); *H04W 16/28* (2013.01);
(Continued)

(58) Field of Classification Search
CPC ..... H04W 16/28; H04W 24/02; H04W 24/10; H04W 4/02; H04W 72/0446; H04W 4/023; H04W 72/044; H04W 72/04; G01S 5/16
See application file for complete search history.

(56) References Cited

U.S. PATENT DOCUMENTS

| 11,638,246 | B2 * | 4/2023 | Hamidi-Sepehr | H04W 72/23 370/329 |
| 2023/0059302 | A1 * | 2/2023 | Manolakos | H04B 7/063 |
| 2023/0309050 | A1 * | 9/2023 | Cha | H04L 5/0023 |

FOREIGN PATENT DOCUMENTS

| CN | 111093267 A | 5/2020 |
| WO | 2020096506 A1 | 5/2020 |

OTHER PUBLICATIONS

PCT/IB2022/062089, "Notification of Transmittal of the International Search Report and teh Written Opinion of the International Searching Authority, or the Declaration", International Searching Authority, Mar. 13, 2023, pp. 1-13.

(Continued)

*Primary Examiner* — Wei Zhao
(74) *Attorney, Agent, or Firm* — Kunzler Bean & Adamson

(57) ABSTRACT

Apparatuses, methods, and systems are disclosed for configuration corresponding to a reconfigurable intelligent surface controller. One method includes providing a capability report to a location management function. The capability report corresponds to reconfigurable intelligent surfaces used for positioning. The method includes transmitting control information to a reconfigurable intelligent surface controller for reflecting a positioning reference signal received from a transmitting device and directed to a receiving device. The method includes transmitting a multi-port positioning reference signal configuration to the receiving device. The method includes transmitting, to the receiving device, information indicating to report measurements corresponding to multi-port positioning reference signals reflected from multiple reconfigurable intelligent surfaces.

20 Claims, 13 Drawing Sheets

(51) Int. Cl.
H04W 4/02 (2018.01)
H04W 16/28 (2009.01)
H04W 24/02 (2009.01)
H04W 24/10 (2009.01)
H04W 72/0446 (2023.01)

(52) U.S. Cl.
CPC ....... *H04W 24/10* (2013.01); *H04W 72/0446* (2013.01)

(56) References Cited

OTHER PUBLICATIONS

Huawei et al., "Considerations on other enhancements for positioning accuracy", 3GPP TSG RAN WG1 Meeting #104-e R1-2101252, Jan. 25-Feb. 5, 2021, pp. 1-5.

Wymeersch et al., "Radio Localization and Mapping with Reconfigurable Intelligent Surfaces", arxiv.org, Cornell University Library, Jun. 11, 2020, pp. 1-9.

3GPP, "3rd Generation Partnership Project; Technical Specification Group Services and System Aspects; Enhancement of 3GPP support for V2X scenarios; Stage 1 (Release 16)", 3GPP TS 22.186 V16.2.0, Jun. 2019, pp. 1-18.

3GPP, "3rd Generation Partnership Project; Technical Specification Group Services and System Aspects; Location Services (LCS); Service description; Stage 1 (Release 16)", 3GPP TS 22.071 V16.0.0, Jul. 2020, pp. 1-55.

3GPP, "3rd Generation Partnership Project; Technical Specification Group Radio Access Network; LTE Positioning Protocol (LPP) (Release 16)", 3GPP TS 37.355 V16.6.0, Sep. 2021, pp. 1-299.

3GPP, "3rd Generation Partnership Project; Technical Specification Group Radio Access Network; NG Radio Access Network (NG-RAN); Stage 2 functional specification of User Equipment (UE) positioning in NG-RAN (Release 16)", 3GPP TS 38.305 V16.6.0, Sep. 2021, pp. 1-120.

3GPP, "3rd Generation Partnership Project; Technical Specification Group Radio Access Network; NR; Physical layer measurements (Release 16)", 3GPP TS 38.215 V16.4.0, Dec. 2020, pp. 1-25.

3GPP, "3rd Generation Partnership Project; Technical Specification Group Services and System Aspects; Service requirements for cyber-physical control applications in vertical domains; Stage 1 (Release 18)", 3GPP TS 22.104 V18.2.0, Sep. 2021, pp. 1-101.

3GPP, "3rd Generation Partnership Project; Technical Specification Group Services and System Aspects; Service requirements for the 5G system; Stage 1 (Release 18)", 3GPP TS 22.261 V18.4.0, Sep. 2021, pp. 1-107.

3GPP, "3rd Generation Partnership Project; Technical Specification Group Services and System Aspects; Study on enhancements for cyber-physical control applications in vertical domains; Stage 1 (Release 17)", 3GPP TS 22.832 V17.4.0, Mar. 2021, pp. 1-87.

Keykhosravi, "Semi-Passive 3D Positioning of Multiple RIS-Enabled Users", IEEE, Apr. 25, 2021, pp. 1-5.

\* cited by examiner

500

| A | D | B | E | C | F | A | D | B | E | C | F | | |
|---|---|---|---|---|---|---|---|---|---|---|---|---|---|
| B | E | C | F | D | A | B | E | C | F | D | A | | |
| C | F | D | A | E | B | C | F | D | A | E | B | | |
| D | A | E | B | F | C | D | A | E | B | F | C | | |
| E | B | F | C | A | D | E | B | F | C | A | D | | |
| F | C | A | D | B | E | F | C | A | D | B | E | | |
| A | D | B | E | C | F | A | D | B | E | C | F | | |
| B | E | C | F | D | A | B | E | C | F | D | A | | |
| C | F | D | A | E | B | C | F | D | A | E | B | | |
| D | A | E | B | F | C | D | A | E | B | F | C | | |
| E | B | F | C | A | D | E | B | F | C | A | D | | |
| F | C | A | D | B | E | F | C | A | D | B | E | | |

CONFIGURATION CORRESPONDING TO A RECONFIGURABLE INTELLIGENT SURFACE CONTROLLER

FIELD

The subject matter disclosed herein relates generally to wireless communications and more particularly relates to configuration corresponding to a reconfigurable intelligent surface controller.

BACKGROUND

In certain wireless communications networks, reconfigurable intelligent surfaces may be used. A reconfigurable intelligent surface may be configured for optimal use.

BRIEF SUMMARY

Methods for configuration corresponding to a reconfigurable intelligent surface controller are disclosed. Apparatuses and systems also perform the functions of the methods. One embodiment of a method includes providing, from a network node, a capability report to a location management function. The capability report corresponds to reconfigurable intelligent surfaces used for positioning. In some embodiments, the method includes transmitting control information to a reconfigurable intelligent surface controller for reflecting a positioning reference signal received from a transmitting device and directed to a receiving device. In certain embodiments, the method includes transmitting a multi-port positioning reference signal configuration to the receiving device. In various embodiments, the method includes transmitting, to the receiving device, information indicating to report measurements corresponding to multi-port positioning reference signals reflected from multiple reconfigurable intelligent surfaces.

One apparatus for configuration corresponding to a reconfigurable intelligent surface controller includes a network node. In some embodiments, the apparatus includes a transmitter that: provides a capability report to a location management function, wherein the capability report corresponds to reconfigurable intelligent surfaces used for positioning; transmits control information to a reconfigurable intelligent surface controller for reflecting a positioning reference signal received from a transmitting device and directed to a receiving device; transmits a multi-port positioning reference signal configuration to the receiving device; and transmits, to the receiving device, information indicating to report measurements corresponding to multi-port positioning reference signals reflected from multiple reconfigurable intelligent surfaces.

Another embodiment of a method for configuration corresponding to a reconfigurable intelligent surface controller includes receiving, at a receiving device, a multi-port positioning reference signal configuration. In some embodiments, the method includes receiving information indicating to report measurements corresponding to multi-port positioning reference signals reflected from multiple reconfigurable intelligent surfaces.

Another apparatus for configuration corresponding to a reconfigurable intelligent surface controller includes a receiving device. In some embodiments, the apparatus includes a receiver that: receives a multi-port positioning reference signal configuration; and receives information indicating to report measurements corresponding to multi-port positioning reference signals reflected from multiple reconfigurable intelligent surfaces.

A further embodiment of a method for configuration corresponding to a reconfigurable intelligent surface controller includes receiving, at a reconfigurable intelligent surface controller, control information for reflecting a positioning reference signal received from a transmitting device and directed to a receiving device. The control information includes a time domain allocation of symbols, slots, or a combination thereof configured to carry positioning reference signal information and positioning spatial information for beamforming the reflected positioning reference signal with a determined angle of departure. In some embodiments, the method includes configuring a reconfigurable intelligent surface based on the control information.

A further apparatus for configuration corresponding to a reconfigurable intelligent surface controller includes a reconfigurable intelligent surface controller. In some embodiments, the apparatus includes a receiver that receives control information for reflecting a positioning reference signal received from a transmitting device and directed to a receiving device. The control information includes a time domain allocation of symbols, slots, or a combination thereof configured to carry positioning reference signal information and positioning spatial information for beamforming the reflected positioning reference signal with a determined angle of departure. In various embodiments, the apparatus includes a processor that configures a reconfigurable intelligent surface based on the control information.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which:

FIG. 5 is a schematic block diagram illustrating one embodiment of a system for multi-port PRS allocation for multiple TRPs and/or multiple RISs (e.g., comb-6);

DETAILED DESCRIPTION

Figure 1:
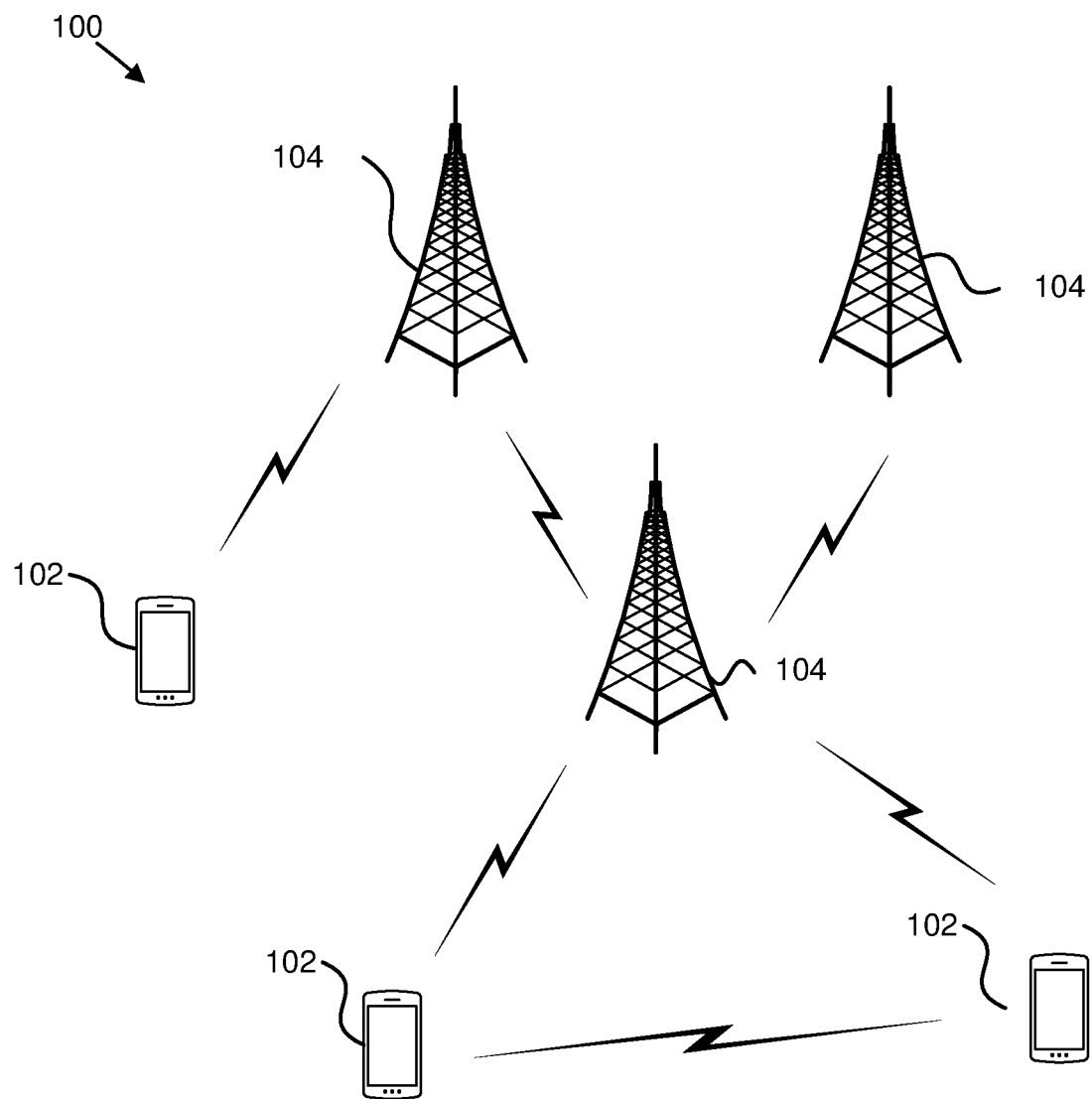
FIG. 1 is a schematic block diagram illustrating one embodiment of a wireless communication system for configuration corresponding to a reconfigurable intelligent surface controller.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in this specification may be labeled as modules, in order to more particularly emphasize their implementation independence. For example, a module may be implemented as a hardware circuit comprising custom very-large-scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be any number of lines and may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. The code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 depicts an embodiment of a wireless communication system 100 for configuration corresponding to a reconfigurable intelligent surface controller. In one embodiment, the wireless communication system 100 includes remote units 102 and network units 104. Even though a specific number of remote units 102 and network units 104 are depicted in FIG. 1, one of skill in the art will recognize that any number of remote units 102 and network units 104 may be included in the wireless communication system 100.

In one embodiment, the remote units 102 may include computing devices, such as desktop computers, laptop computers, personal digital assistants ("PDAs"), tablet computers, smart phones, smart televisions (e.g., televisions connected to the Internet), set-top boxes, game consoles, security systems (including security cameras), vehicle on-board computers, network devices (e.g., routers, switches, modems), aerial vehicles, drones, or the like. In some embodiments, the remote units 102 include wearable devices, such as smart watches, fitness bands, optical head-mounted displays, or the like. Moreover, the remote units 102 may be referred to as subscriber units, mobiles, mobile stations, users, terminals, mobile terminals, fixed terminals, subscriber stations, UE, user terminals, a device, or by other terminology used in the art. The remote units 102 may communicate directly with one or more of the network units 104 via UL communication signals. In certain embodiments, the remote units 102 may communicate directly with other remote units 102 via sidelink communication.

The network units 104 may be distributed over a geographic region. In certain embodiments, a network unit 104 may also be referred to and/or may include one or more of an access point, an access terminal, a base, a base station, a location server, a core network ("CN"), a radio network entity, a Node-B, an evolved node-B ("eNB"), a 5G node-B ("gNB"), a Home Node-B, a relay node, a device, a core network, an aerial server, a radio access node, an access point ("AP"), new radio ("NR"), a network entity, an access and mobility management function ("AMF"), a unified data management ("UDM"), a unified data repository ("UDR"), a UDM/UDR, a policy control function ("PCF"), a radio access network ("RAN"), a network slice selection function ("NSSF"), an operations, administration, and management ("OAM"), a session management function ("SMF"), a user plane function ("UPF"), an application function, an authentication server function ("AUSF"), security anchor functionality ("SEAF"), trusted non-3GPP gateway function ("TNGF"), a reconfigurable intelligent surface ("RIS") controller, a RIS, or by any other terminology used in the art. The network units 104 are generally part of a radio access network that includes one or more controllers communicably coupled to one or more corresponding network units 104. The radio access network is generally communicably coupled to one or more core networks, which may be coupled to other networks, like the Internet and public switched telephone networks, among other networks. These and other elements of radio access and core networks are not illustrated but are well known generally by those having ordinary skill in the art.

In one implementation, the wireless communication system 100 is compliant with NR protocols standardized in third generation partnership project ("3GPP"), wherein the network unit 104 transmits using an OFDM modulation scheme on the downlink ("DL") and the remote units 102 transmit on the uplink ("UL") using a single-carrier frequency division multiple access ("SC-FDMA") scheme or an orthogonal frequency division multiplexing ("OFDM") scheme. More generally, however, the wireless communication system 100 may implement some other open or proprietary communication protocol, for example, WiMAX, institute of electrical and electronics engineers ("IEEE") 802.11 variants, global system for mobile communications ("GSM"), general packet radio service ("GPRS"), universal mobile telecommunications system ("UMTS"), long term evolution ("LTE") variants, code division multiple access 2000 ("CDMA2000"), Bluetooth®, ZigBee, Sigfoxx, among other protocols. The present disclosure is not intended to be limited to the implementation of any particular wireless communication system architecture or protocol.

The network units 104 may serve a number of remote units 102 within a serving area, for example, a cell or a cell sector via a wireless communication link. The network units 104 transmit DL communication signals to serve the remote units 102 in the time, frequency, and/or spatial domain.

In various embodiments, a network unit 104 may provide, from a network node, a capability report to a location management function. The capability report corresponds to reconfigurable intelligent surfaces used for positioning. In some embodiments, the network unit 104 may transmit control information to a reconfigurable intelligent surface controller for reflecting a positioning reference signal received from a transmitting device and directed to a receiving device. In certain embodiments, the network unit 104 may transmit a multi-port positioning reference signal configuration to the receiving device. In various embodiments, the network unit 104 may transmit, to the receiving device, information indicating to report measurements corresponding to multi-port positioning reference signals reflected from multiple reconfigurable intelligent surfaces. Accordingly, the network unit 104 may be used for configuration corresponding to a reconfigurable intelligent surface controller.

In certain embodiments, a remote unit 102 and/or a network unit 104 may receive, at a receiving device, a multi-port positioning reference signal configuration. In some embodiments, the remote unit 102 and/or the network unit 104 may receive information indicating to report measurements corresponding to multi-port positioning reference signals reflected from multiple reconfigurable intelligent surfaces. Accordingly, the remote unit 102 and/or the network unit 104 may be used for configuration corresponding to a reconfigurable intelligent surface controller.

In certain embodiments, a network unit 104 (e.g., reconfigurable intelligent surface controller) may receive, at a reconfigurable intelligent surface controller, control information for reflecting a positioning reference signal received from a transmitting device and directed to a receiving device. The control information includes a time domain allocation of symbols, slots, or a combination thereof configured to carry positioning reference signal information and positioning spatial information for beamforming the reflected positioning reference signal with a determined angle of departure. In some embodiments, the network unit 104 may configure a reconfigurable intelligent surface based on the control information. Accordingly, the network unit 104 may be used for configuration corresponding to a reconfigurable intelligent surface controller.

Figure 2:
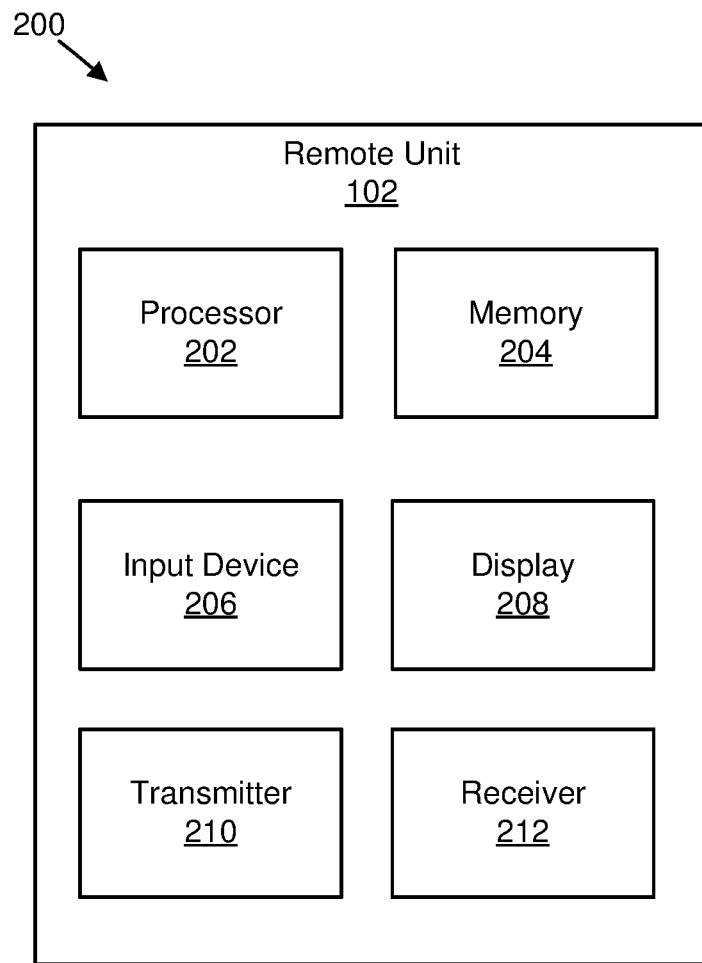
FIG. 2 is a schematic block diagram illustrating one embodiment of an apparatus that may be used for configuration corresponding to a reconfigurable intelligent surface controller.

FIG. 2 depicts one embodiment of an apparatus 200 that may be used for configuration corresponding to a reconfigurable intelligent surface controller. The apparatus 200 includes one embodiment of the remote unit 102. Furthermore, the remote unit 102 may include a processor 202, a memory 204, an input device 206, a display 208, a transmitter 210, and a receiver 212. In some embodiments, the input device 206 and the display 208 are combined into a single device, such as a touchscreen. In certain embodiments, the remote unit 102 may not include any input device 206 and/or display 208. In various embodiments, the remote unit 102 may include one or more of the processor 202, the memory 204, the transmitter 210, and the receiver 212, and may not include the input device 206 and/or the display 208.

The processor 202, in one embodiment, may include any known controller capable of executing computer-readable instructions and/or capable of performing logical operations. For example, the processor 202 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 202 executes instructions stored in the memory 204 to perform the methods and routines described herein. The processor 202 is communicatively coupled to the memory 204, the input device 206, the display 208, the transmitter 210, and the receiver 212.

The memory 204, in one embodiment, is a computer readable storage medium. In some embodiments, the memory 204 includes volatile computer storage media. For example, the memory 204 may include a RAM, including dynamic RAM ("DRAM"), synchronous dynamic RAM ("SDRAM"), and/or static RAM ("SRAM"). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media. In some embodiments, the memory 204 also stores program code and related data, such as an operating system or other controller algorithms operating on the remote unit 102.

The input device 206, in one embodiment, may include any known computer input device including a touch panel, a button, a keyboard, a stylus, a microphone, or the like. In some embodiments, the input device 206 may be integrated with the display 208, for example, as a touchscreen or similar touch-sensitive display. In some embodiments, the input device 206 includes a touchscreen such that text may be input using a virtual keyboard displayed on the touchscreen and/or by handwriting on the touchscreen. In some embodiments, the input device 206 includes two or more different devices, such as a keyboard and a touch panel.

The display 208, in one embodiment, may include any known electronically controllable display or display device. The display 208 may be designed to output visual, audible, and/or haptic signals. In some embodiments, the display 208 includes an electronic display capable of outputting visual data to a user. For example, the display 208 may include, but is not limited to, a liquid crystal display ("LCD"), a light emitting diode ("LED") display, an organic light emitting diode ("OLED") display, a projector, or similar display device capable of outputting images, text, or the like to a user. As another, non-limiting, example, the display 208 may include a wearable display such as a smart watch, smart glasses, a heads-up display, or the like. Further, the display 208 may be a component of a smart phone, a personal digital assistant, a television, a table computer, a notebook (laptop) computer, a personal computer, a vehicle dashboard, or the like.

In certain embodiments, the display 208 includes one or more speakers for producing sound. For example, the display 208 may produce an audible alert or notification (e.g., a beep or chime). In some embodiments, the display 208 includes one or more haptic devices for producing vibrations, motion, or other haptic feedback. In some embodiments, all or portions of the display 208 may be integrated with the input device 206. For example, the input device 206 and display 208 may form a touchscreen or similar touch-sensitive display. In other embodiments, the display 208 may be located near the input device 206.

In certain embodiments, the receiver 212: receives a multi-port positioning reference signal configuration; and receives information indicating to report measurements corresponding to multi-port positioning reference signals reflected from multiple reconfigurable intelligent surfaces.

Although only one transmitter 210 and one receiver 212 are illustrated, the remote unit 102 may have any suitable number of transmitters 210 and receivers 212. The transmitter 210 and the receiver 212 may be any suitable type of transmitters and receivers. In one embodiment, the transmitter 210 and the receiver 212 may be part of a transceiver.

Figure 3:
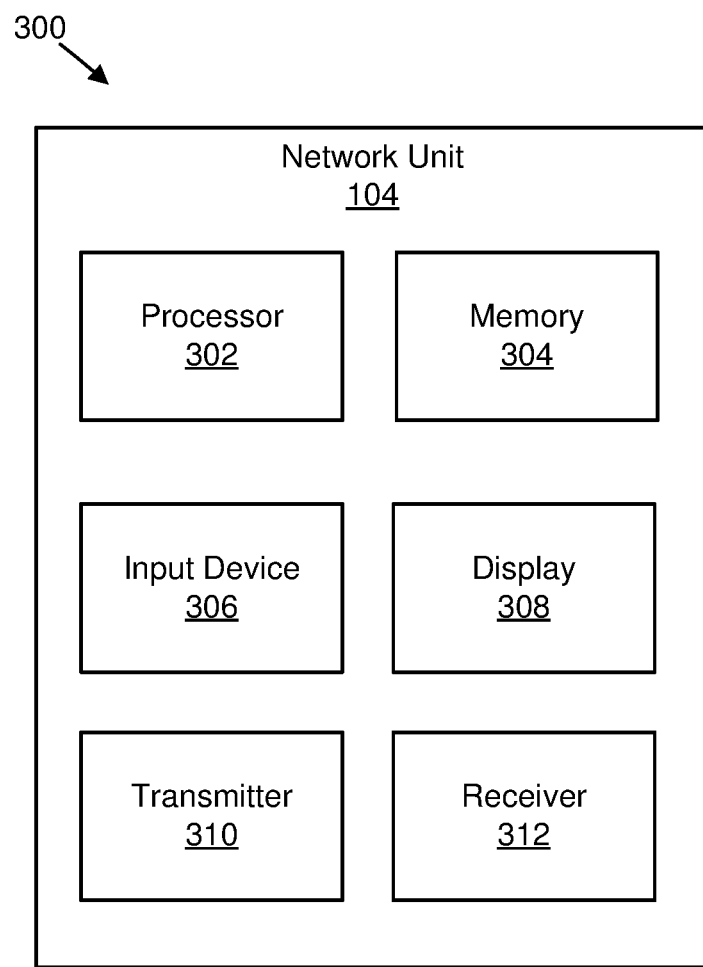
FIG. 3 is a schematic block diagram illustrating one embodiment of an apparatus that may be used for configuration corresponding to a reconfigurable intelligent surface controller.

FIG. 3 depicts one embodiment of an apparatus 300 that may be used for configuration corresponding to a reconfigurable intelligent surface controller. The apparatus 300 includes one embodiment of the network unit 104. Furthermore, the network unit 104 may include a processor 302, a memory 304, an input device 306, a display 308, a transmitter 310, and a receiver 312. As may be appreciated, the processor 302, the memory 304, the input device 306, the display 308, the transmitter 310, and the receiver 312 may be substantially similar to the processor 202, the memory 204, the input device 206, the display 208, the transmitter 210, and the receiver 212 of the remote unit 102, respectively.

In certain embodiments, the transmitter 310: provides a capability report to a location management function, wherein the capability report corresponds to reconfigurable intelligent surfaces used for positioning; transmits control information to a reconfigurable intelligent surface controller for reflecting a positioning reference signal received from a transmitting device and directed to a receiving device; transmits a multi-port positioning reference signal configuration to the receiving device; and transmits, to the receiving device, information indicating to report measurements corresponding to multi-port positioning reference signals reflected from multiple reconfigurable intelligent surfaces.

In some embodiments, the receiver 312: receives a multi-port positioning reference signal configuration; and receives information indicating to report measurements corresponding to multi-port positioning reference signals reflected from multiple reconfigurable intelligent surfaces.

In various embodiments, the receiver 312: receives control information for reflecting a positioning reference signal received from a transmitting device and directed to a receiving device. The control information includes a time domain allocation of symbols, slots, or a combination thereof configured to carry positioning reference signal information and positioning spatial information for beamforming the reflected positioning reference signal with a determined angle of departure. In various embodiments, the processor 302 configures a reconfigurable intelligent surface based on the control information.

In certain embodiments, RISs are used for wireless networks. In such embodiments, RISs may be used for coverage extension of downlink ("DL") and/or uplink ("UL") (e.g., for signal blockage that causes drop of signal-to-noise ratio ("SNR") or beam failure of the DL and/or UL beams). Moreover, RISs may be configured with the help of control information from a network for efficient reflection of a signal that makes use of time and/or spatial information of a user equipment ("UE") to network interface ("Uu") link provided by the network. The time and/or spatial information may include time and common and UE dedicated spatial information for beamforming. The ability to control a surface to perform a specific beamforming of a reflected signal to a preferred direction with configurable beam gain and/or width that may open the door for other applications other than coverage extension. Indoor and/or outdoor positioning with the help of RIS may be seen as an application that may be brought to a system by using controllable manipulation of a reflection from multiple intelligent surfaces. This may be beneficial in areas where a non-line-of-sight ("NLOS") and/or multipath effect is prevalent. However, in some embodiments, to facilitate this, reference signals used for positioning measurement may be designed to count for the reflections from different RISs in different known locations.

In various embodiments, methods and/or procedures may be used to improve a positioning accuracy with the help of an RIS including a new configuration of positioning reference signals ("PRS") to enable the use of multiple RISs for positioning.

In a first embodiment, there may be a multi-port PRS configuration for multi-RIS. In the first embodiment, the multi-port PRS configuration may consider one or more RIS that may be provided by a gNB to a location management function ("LMF") as part of a PRS resource set recommendation. In such an embodiment, each PRS resource set or each PRS resource in a resource set may be associated with one or more RISs. Request and response messaging may be signalled along a new radio ("NR") positioning protocol A ("NRPPa") interface using messages such as a transmission reception point ("TRP") information exchange, positioning information update, or the like. Upon receiving a request for a UE location from either the UE (e.g., UE-based positioning, mobile originated-location request ("MO-LR")) or an external location services ("LCS") client (e.g., mobile terminated-location request ("MT-LT"), network initiated-location request ("NI-LR")), the LMF may trigger the gNB to report a capability in terms of a number of PRS resources to be configured to the gNB depending on a number of RISs that can be used for reflecting the multi-port PRS. Upon receiving a capability report from the gNB, the LMF configures the UE with a configuration of the PRS resources to be beamformed by the gNB to multiple RISs. In certain embodiments, information may be signalled using TRP information exchange, positioning information update messages, or the like along an NRPPa interface. In such embodiments, the gNB applies a spatial filter for each PRS resource to beamform a signal to a corresponding RIS. The spatial filter may be the same or different based on a reference signal ("RS") (e.g., synchronization signal block ("SSB"), channel state information ("CSI") RS ("CSI-RS")) with an associated quasi-co-location ("QCL") assumption (e.g., type c, type d, or the like). The multi-port PRS signal is sent towards multiple RISs in a gNB coverage area. The gNB configures the multiple RISs with time and beam information for each PRS resource. The selected RISs to be involved in reflecting the PRS may depend on their location relative to an initial approximate location of a UE, or based on a previous report from the UE for the identification of the RISs that may serve the UE (e.g., based on sending each RIS specific RS towards one RIS, the UE reports a measured power from each).

In some embodiments, an approximate location may be derived a priori based on multiple approaches that may include: 1) using NR DL and UL enhanced ("E") cell identifier ("ID") ("CID") ("E-CID") positioning methods based on radio resource management ("RRM") measurements such as SSB reference signal received power ("RSRP") ("SSB-RSRP"), CSI RSRP ("CSI-RSRP"), sounding reference signal ("SRS") RSRP ("SRS-RSRP"), and so forth; and/or 2) radio access technology ("RAT") independent positioning methods such as global navigation satellite system ("GNSS"), wireless local area network ("WLAN"), and so forth.

In various embodiments, transmission and reception point ("TRP") information may be beamformed in a specific direction.

In certain embodiments, a UE receives, from a LMF, a PRS mapping configuration that may be in different symbols corresponding to different RISs. In such embodiments, each of one or more symbols carrying PRS may be beamformed with a spatial filter towards one RIS. In some embodiments, a gNB may configure one PRS port for a direct path to a UE where a PRS signal is beamformed directly towards the UE. In various embodiments, PRS resources are mapped with different frequency offsets (e.g., with comb-6 frequency offset up to 6 PRS resource IDs may be configured, each associated with one RIS and beamformed with a spatial filter towards a corresponding RIS). In certain embodiments, a PRS associated with each RIS may be configured with an offset with respect to a resource slot or symbol. The PRS configured for each RIS may be mapped on different frequency layers, TRP levels, and/or resource sets.

In some embodiments, a UE is indicated (e.g., transmitted information) to measure configured PRS resources and the UE reports a measurement associated with each PRS resource ID, resource set ID, RIS ID, TRP ID, and/or frequency layer. In such embodiments, if a signal time delay between a gNB and an RIS is known, the gNB may inform the UE about a time of departure and/or reflection from each RIS for the UE to report a receive ("RX") to transmit ("TX") RX-TX time difference. In various embodiments, a gNB or LMF may configure a window with a defined start time and a window length in which to measure PRS resources, considering a delay between the gNB, a RIS, and a UE.

Figure 4:
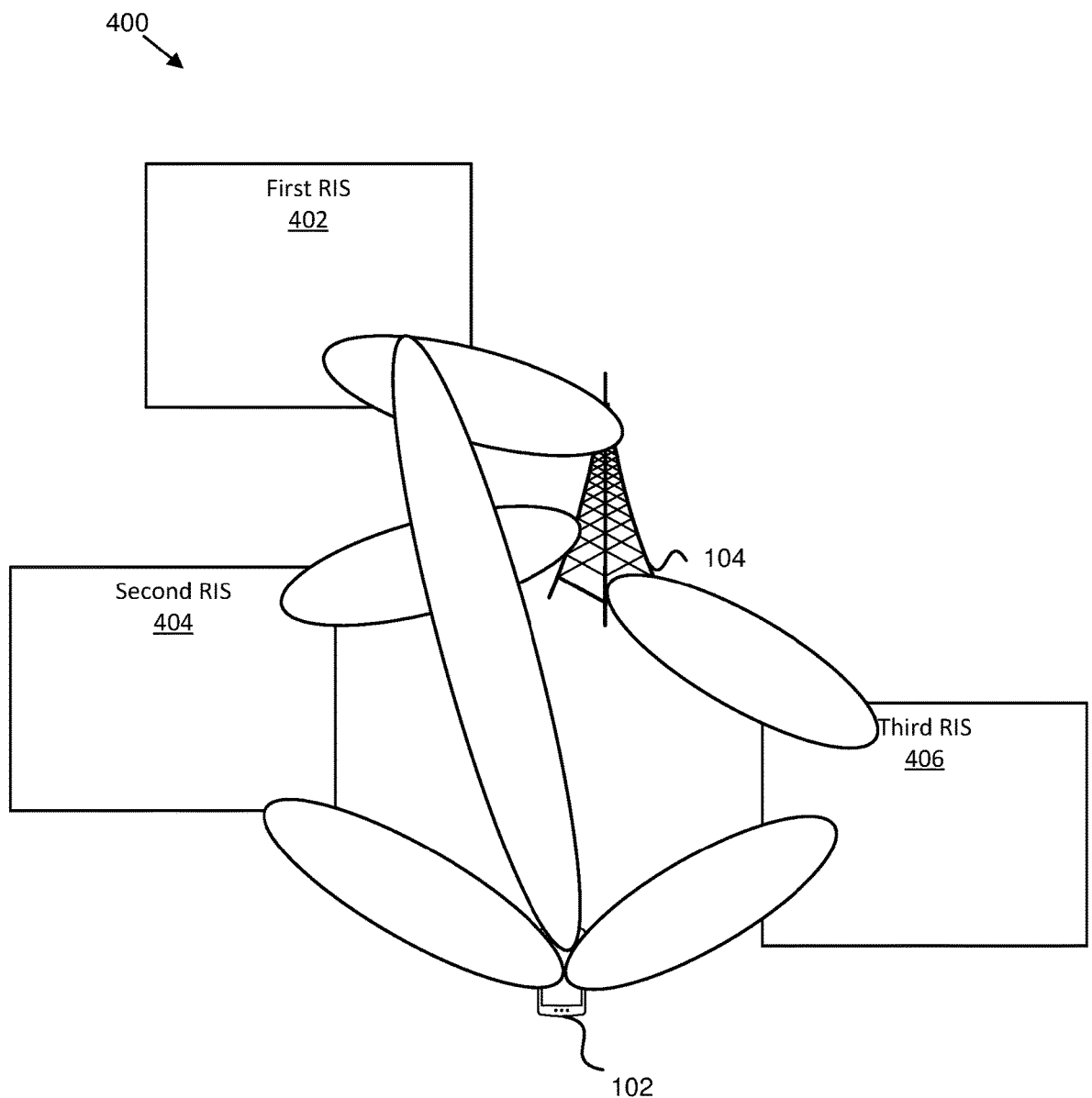
FIG. 4 is a schematic block diagram illustrating one embodiment of a system for multi-port PRS transmission with multiple RISs.

FIG. 4 is a schematic block diagram illustrating one embodiment of a system 400 for multi-port PRS transmission with multiple RISs. The system 400 includes a first RIS 402, a second RIS 404, a third RIS 406, the remote unit 102, and the network unit 104. The network unit 104 transmits time and/or beamforming information to a RIS controller of each of the first RIS 402, the second RIS 404, and/or the third RIS 406. Furthermore, the network unit 104 transmits information from one or more PRS ports to the first RIS 402, the second RIS 404, and/or the third RIS 406. Moreover, the remote unit 102 is indicated and/or configured to measure and/or report multi-port PRS received from transmissions reflected by the first RIS 402, the second RIS 404, and/or the third RIS 406.

In certain embodiments, a LMF configures a UE with multiple PRS resource sets based on a reported capability from different gNBs in terms of a number of RISs that can be used by each gNB. In such embodiments, the multi-PRS resources are mapped with frequency offsets such that each gNB is configured to transmits multiple PRS resources with each PRS resource offset from one another by a pre-defined value. The gNB configures each RIS controller to beamform the specific PRS signal towards the UE. FIG. 5 shows an example of configuring 4 gNBs and/or TRPs (e.g., 2 TRPs with 2 RISs and the other two with single or no RIS in case of PRS configuration comb-6).

Specifically, FIG. 5 is a schematic block diagram illustrating one embodiment of a system 500 for multi-port PRS allocation for multiple TRPs and/or multiple RISs (e.g., comb-6). The system 500 shows individual resource elements ("REs") extending in a time domain (e.g., extending horizontally from left to right) and in a frequency domain (e.g., extending vertically from top to bottom). Elements labeled "A" represent a PRS resource set corresponding to a fourth TRP ("TRP4") corresponding to single or no RIS, elements labeled "B" represent a PRS resource set corresponding to a second TRP (TRP2) corresponding to a second RIS (RIS2), elements labeled "C" represent a PRS resource set corresponding to a third TRP (TRP3) corresponding to a single or no RIS, elements labeled "D" represent a PRS resource set corresponding to a first TRP (TRP1) corresponding to RIS2, elements labeled "E" represent a PRS resource set corresponding to TRP2 corresponding to a first RIS (RIS1), and elements labeled "F" represent a PRS resource set corresponding to TRP1 corresponding to RIS1.

In some embodiments, a UE is indicated with a multi-port PRS configuration to measure PRS for each gNB and for each RIS and report the measurement associated with the PRS resource ID (e.g., which corresponds to different cell IDs and different RIS IDs) to the LMF so that the LMF performs a location calculation based on PRS RSRP, observed time difference of arrival ("OTDOA"), DL time difference of arrival ("TDOA") ("DL-TDOA") or angle of departure ("AoD") for each gNB and each RIS, or a combination thereof.

Figure 6:
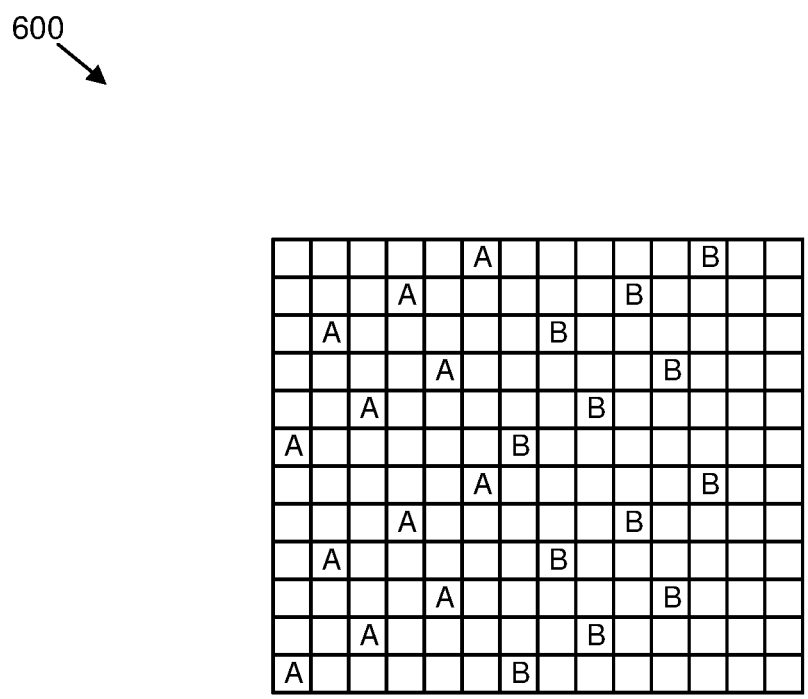
FIG. 6 is a schematic block diagram illustrating one embodiment of a system for time domain based multi-port PRS transmission for multiple RISs.
Figure 7:
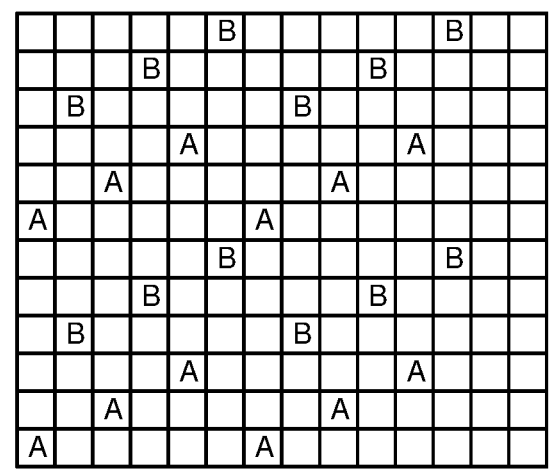
FIG. 7 is a schematic block diagram illustrating another embodiment of a system for time domain based multi-port PRS transmission for multiple RISs.

In various embodiments, to reduce interference from RISs that may reflect PRS resources that are intended or beamformed to a different RIS, a configuration of PRS for different RISs is configured in time domain, such that for some symbols of the PRS slot, a spatial filter is applied towards a first RIS, while a second and/or other RISs are switched off, and for other PRS symbols, a spatial filter is applied to beamform the PRS to a second RIS, while other RISs are switched off as illustrated in FIGS. 6 and 7 for one gNB and/or TRP with 2 RISs.

Specifically, FIG. 6 is a schematic block diagram illustrating one embodiment of a system 600 for time domain based multi-port PRS transmission for multiple RISs. The system 600 shows individual REs extending in a time domain (e.g., extending horizontally from left to right) and in a frequency domain (e.g., extending vertically from top to bottom). Elements labeled "A" represent a PRS resource set corresponding to TRP1 corresponding to RIS1 and a first PRS port, and elements labeled "B" represent a PRS resource set corresponding to TRP1 corresponding to RIS2 and a second PRS port.

Moreover, FIG. 7 is a schematic block diagram illustrating another embodiment of a system 700 for time domain based multi-port PRS transmission for multiple RISs. The system 700 shows individual REs extending in a time domain (e.g., extending horizontally from left to right) and in a frequency domain (e.g., extending vertically from top to bottom). Elements labeled "A" represent a PRS resource set corresponding to TRP1 corresponding to RIS1 and a first PRS port, and elements labeled "B" represent a PRS resource set corresponding to TRP1 corresponding to RIS2 and a second PRS port.

In certain embodiments, a UE is configured with a mapping of different PRS in a time domain and a periodicity to perform averaging of a PRS measurement (e.g., each with a corresponding RIS such that averaging is performed with RIS association). The configured periodicity and resource slot offset of the PRS transmissions may be a function of a number of RIS elements in the vicinity of the UE (e.g., the LMF configures a periodicity with shorter intervals for RIS-based PRS transmissions when compared to the direct PRS transmission from gNB to UE for increased reliability and to account for the signaling delay between a gNB, an RIS, and a UE).

In some embodiments, a UE requests on-demand PRS configuration from an LMF (e.g., for UE-initiated on-demand PRS) based on the number of RISs to be involved in the positioning. The LMF sends to the UE the configuration of the multi-PRS ports for multiple RISs. In various embodiments, LMF-initiated on-demand PRS may be used to request an update to a RIS-based PRS configuration including parameters such as start and/or end time of DL PRS transmission, DL PRS periodicity, DL PRS resource bandwidth, DL PRS QCL information, DL PRS resource repetition factor, a number of DL PRS resource symbols per DL PRS resource, DL PRS CombSizeN, a number of DL PRS frequency layers, and/or an ON/OFF indicator (e.g., for LMF initiated request only) which may be applicable to TRP and RIS elements.

In various embodiments, configured PRS are scattered in time and frequency with pre-defined time and/or frequency offsets. In certain embodiments, an LMF configures a UE with PRS based on orthogonal sequences (e.g., Zadoff chu sequence). In such embodiments, the PRS are generated by orthogonal sequences, each scrambled and/or generated with an RIS ID. Moreover, the gNB applies an RIS specific spatial filter (e.g., based on a location of an RIS relative to the gNB) for each sequence. The UE is indicated with the sequence ID, and the mapping information for each RIS based sequence, and indicated to measure and report the PRS RSRP, reference signal time difference ("RSTD"), and/or AoD for each sequence. In some embodiments, a gNB calculates a location of a UE based on a reported measurement of the UE for the configured RISs and provides the location information to an LMF. The LMF, upon receiving an initial location calculated from multiple gNBs, calculates a final location of the UE. In various embodiments, a gNB forwards measurements of a UE for each RIS to a LMF for calculating the UE location.

In certain embodiments, a gNB may configure one or more RISs to perform beam sweeping of a PRS signal. The UE may be configured with PRS resource sets to be transmitted from the gNB and configured to measure and report PRS measurements associated with time slots. The gNB configures one or more RISs to apply beam sweeping of the PRS for different PRS slots to cover the area where the UE is expected to be located. For a preconfigured pattern, the RIS changes reflection coefficients for different PRS slots to beamform the signal to a different direction. The UE is configured to report the beam quality, AoD, or a combination thereof to the gNB. The UE performs averaging of the measurements over the slots configured with a specific beam direction. The location and/or periodicity of PRS slots for each beam needs to be configured to (e.g., transmitted to) the UE in advance.

Figure 8:
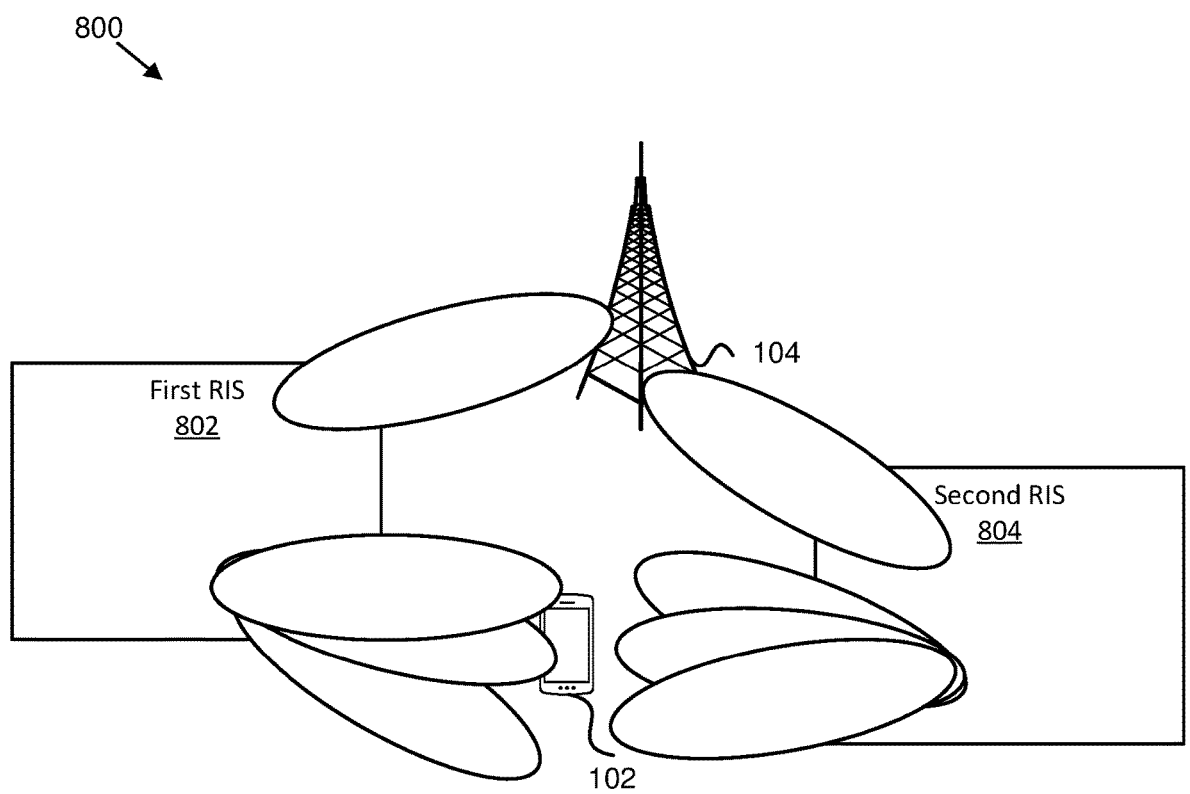
FIG. 8 is a schematic block diagram illustrating one embodiment of a system for PRS beam sweeping from RIS for different PRS slots.

FIG. 8 is a schematic block diagram illustrating one embodiment of a system 800 for PRS beam sweeping from RIS for different PRS slots. The system 800 includes a first RIS 802, a second RIS 804, the remote unit 102, and the network unit 104. The network unit 104 transmits time and/or sweep information to a RIS controller of each of the first RIS 802 and/or the second RIS 804. Furthermore, the network unit 104 transmits information from a first PRS port to the first RIS 802 and/or information from a second PRS port to the second RIS 404. Moreover, the remote unit 102 is indicated and/or configured to measure and/or report beam qualities received from transmissions reflected by the first RIS 802 (e.g., multiple beams from the first RIS 802) and the second RIS 804 (e.g., multiple beams from the second RIS 804).

In some embodiments, an LMF may configure muting pattern as a function of serving and/or neighboring (e.g., non-serving) cells and associated RIS elements with each of the serving and/or neighboring cells. To limit interference and improve hearability of PRS signals at a UE, the LMF may centrally mute different gNB TRPs and/or RIS beams. As such, a muting pattern bitmap configuration may include time domain locations of PRS resources to be muted, which may include TRPs and/or RIS beams. In addition, the muting pattern configuration may be applicable to a repetition of PRS transmissions in each TRP and RIS beam.

In various embodiments, if an RIS is equipped with a radio frequency ("RF") chain and a base band process to extract and measure a RS, it may be configured by a gNB with information about SRS resources assigned to the UE to extract SRS, measure the ToA and/or AoD, and report the measurement to the gNB. The UE may be configured with multiple SRS resources and/or beams for sending the SRS on pre-defined resources. One or more RISs may be configured to measure each SRS and report the measurement to the gNB. In one embodiment, a gNB may perform triangulation based on a report received from multiple RISs and report the initial location of the UE to the LMF. The LMF, upon receiving the initial location calculated from multiple gNB s, calculates a final location of the UE. In another embodiment, a gNB combines measurements from multiple RISs and forwards the measurement to an LMF for calculating a location. In such an embodiment, an SRS association with different RISs may be signaled to the LMF in advance as a gNB recommendation along with other RIS specific information such as locations of RISs relative to the gNB.

Figure 9:
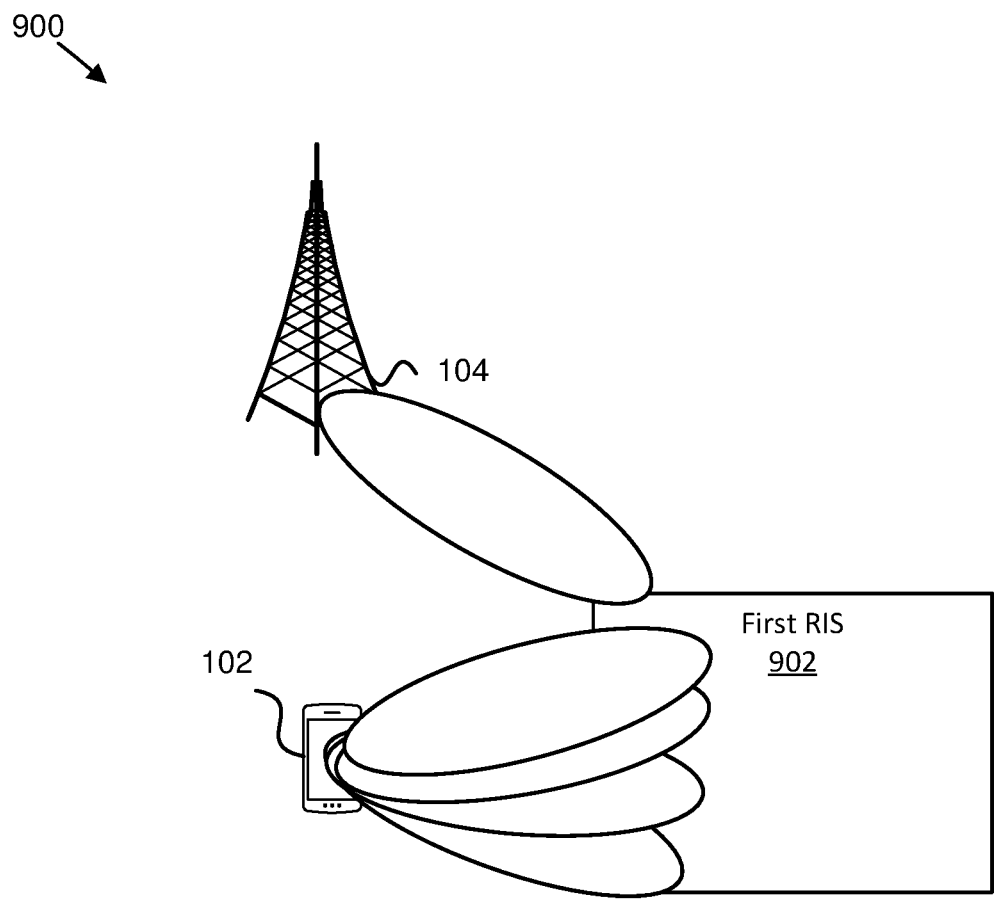
FIG. 9 is a schematic block diagram illustrating one embodiment of a system for RIS segmentation with time domain beam association.

In a second embodiment, there may be single port PRS for a single RIS with multiple segments. According to the second embodiment, upon receiving a recommendation from a gNB about a number of RIS segments to be involved in positioning, an LMF configures a UE with a single port PRS resource set to be beamformed towards an RIS. The gNB sends to an RIS controller a surface split configuration. For example, for a single RIS deployed for a gNB or identified for positioning, the gNB sends the single port PRS towards the RIS with applying an associated spatial filter and indicates to the RIS controller to apply splitting the surfaces to multiple segments such that each segment is switched on during a configured time window (some PRS symbols on a PRS slot, or some PRS slots in the PRS period), such that for different time slots the PRS signal is reflected from a specific segment of the surface with a specific direction and/or AoD as shown in FIG. 9. A specific segment of the surface may be associated with an ID based on segmentation of the surface. A segment ID and/or surface ID may be associated with one or more RIS beams. The UE is indicated to (e.g., transmitted information to) measure the PRS and to average the measurements in terms of the specified time slots and/or periodicity of the PRS reflected from each segment. The LMF may configure the number of samples to measure and average from each segment subject to a UE capability.

FIG. 9 is a schematic block diagram illustrating one embodiment of a system 900 for RIS segmentation with time domain beam association. The system 900 includes a first RIS 902, the remote unit 102, and the network unit 104. The network unit 104 transmits segment information to a RIS controller of the first RIS 902. Furthermore, the network unit 104 transmits information from a first PRS port to the first RIS 902. Moreover, the remote unit 102 is indicated and/or configured to measure, average, and/or report average PRS received from transmissions reflected by multiple segments of the first RIS 902 (e.g., multiple beams from the first RIS 902) according to the configured segments.

Figure 10:
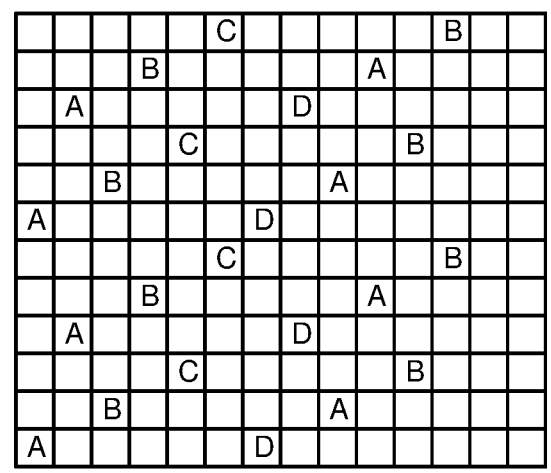
FIG. 10 is a schematic block diagram illustrating one embodiment of a system for PRS symbol grouping for multiple RIS segments.

In certain embodiments, as illustrated in FIG. 10, a gNB configures an RIS controller to group PRS symbols in a PRS slot and beamform a signal from different RIS segments such that during each group of PRS symbols in the PRS slot, one RIS segment is switched on to beamform the signal, while other segments are switched off so that a measurement at a UE corresponds to different AoD for each RIS segment that gives multiple AoD measurements which depends on a number of the used RIS segments for estimating the UE location.

FIG. 10 is a schematic block diagram illustrating one embodiment of a system 1000 for PRS symbol grouping for multiple RIS segments. The system 1000 shows individual REs extending in a time domain (e.g., extending horizontally from left to right) and in a frequency domain (e.g., extending vertically from top to bottom). Elements labeled "A" represent a PRS resource set corresponding to a first segment in which the first segment is on and others are off, elements labeled "B" represent a PRS resource set corresponding to a second segment in which the second segment is on and others are off, elements labeled "C" represent a PRS resource set corresponding to a third segment in which the third segment is on and others are off, and elements labeled "D" represent a PRS resource set corresponding to a fourth segment in which the fourth segment is on and others are off.

In some embodiments, a UE is indicated to perform averaging of a measurement based on a periodicity of a PRS reflected from each segment and indicated to report the measurement. In one embodiment, a UE reports a measurement of PRS for different time windows and/or different RIS segments to a gNB and the gNB calculates a UE location and provides the initial UE location information to an LMF. The LMF, upon receiving the initial location calculated from multiple gNBs, calculates a final location of the UE. In another embodiment, a UE is configured to measure and report PRS measurements for different RIS segments to an LMF such that LMF combines the report from the UE corresponding to the serving gNB and/or RISs with the UE report corresponding to other gNBs for a location estimation. In such an embodiment, the LMF receives capability information from the gNB about the intended segmentation of the RIS and location information for each segment for the purpose of triangulation and location calculation.

In various embodiments, a gNB may configure a RIS to perform beam sweeping of a single port PRS signal from different RIS segments in different time slots. Each RIS segment may be configured to apply beamforming in a certain direction and to apply beam sweeping for multiple PRS slots. The PRS period may be divided into multiple slots. Each group of PRS slots may be reflected from one RIS segment, while other segments are turned off. For the PRS slot group associated with each segment, different spatial filters are configured to (e.g., transmitted to) the segment to be applied on different PRS slots in the group so that the PRS signal is beamformed with sweeping to different directions to cover the required area. The UE is configured with a PRS resource set to be transmitted from the gNB and configured to measure and report PRS measurement associated with corresponding time slots (e.g., PRS group for each segment and the slots in each group). For a preconfigured pattern, the UE is configured to report the beam quality, AoD, or a combination thereof to the gNB. The UE performs averaging of the measurement over the slots configured with a specific beam direction. The location and/or periodicity of the PRS slots for each beam may be configured to (e.g., transmitted to) the UE in advance.

In certain embodiments, an RIS with measurement capability (e.g., with Baseband) may be configured by a gNB to measure and report an SRS signal received from a UE at different RIS segments. If the RIS is equipped with an RF chain and a Base band process to extract and measure RS, it may be configured with SRS resources assigned to the UE to extract SRS, measure the ToA and/or AoD, and report the measurement to the gNB. The gNB sends a configuration to an RIS controller for splitting the surface into multiple segments, each configured to measure the SRS from the UE and report the AoA to the gNB. The UE is configured with an SRS resource and/or beam for sending the SRS on pre-defined resources. The RIS is configured to measure the SRS from multiple segments in the surface and report the measurement to the gNB. Upon receiving AoA of the SRS from different RIS segments, the gNB may perform triangulation based on the report received from the different segments and report the initial location of the UE to the LMF. The LMF, upon receiving the initial location calculated from multiple gNBs, calculates the final location of the UE. In one embodiment, a gNB combines measurements from multiple RIS segments and forwards the combined measurement to an LMF for calculating a location. In such an embodiment, information about a number of RIS segments and their respective locations may be signaled to the LMF.

Figure 11:
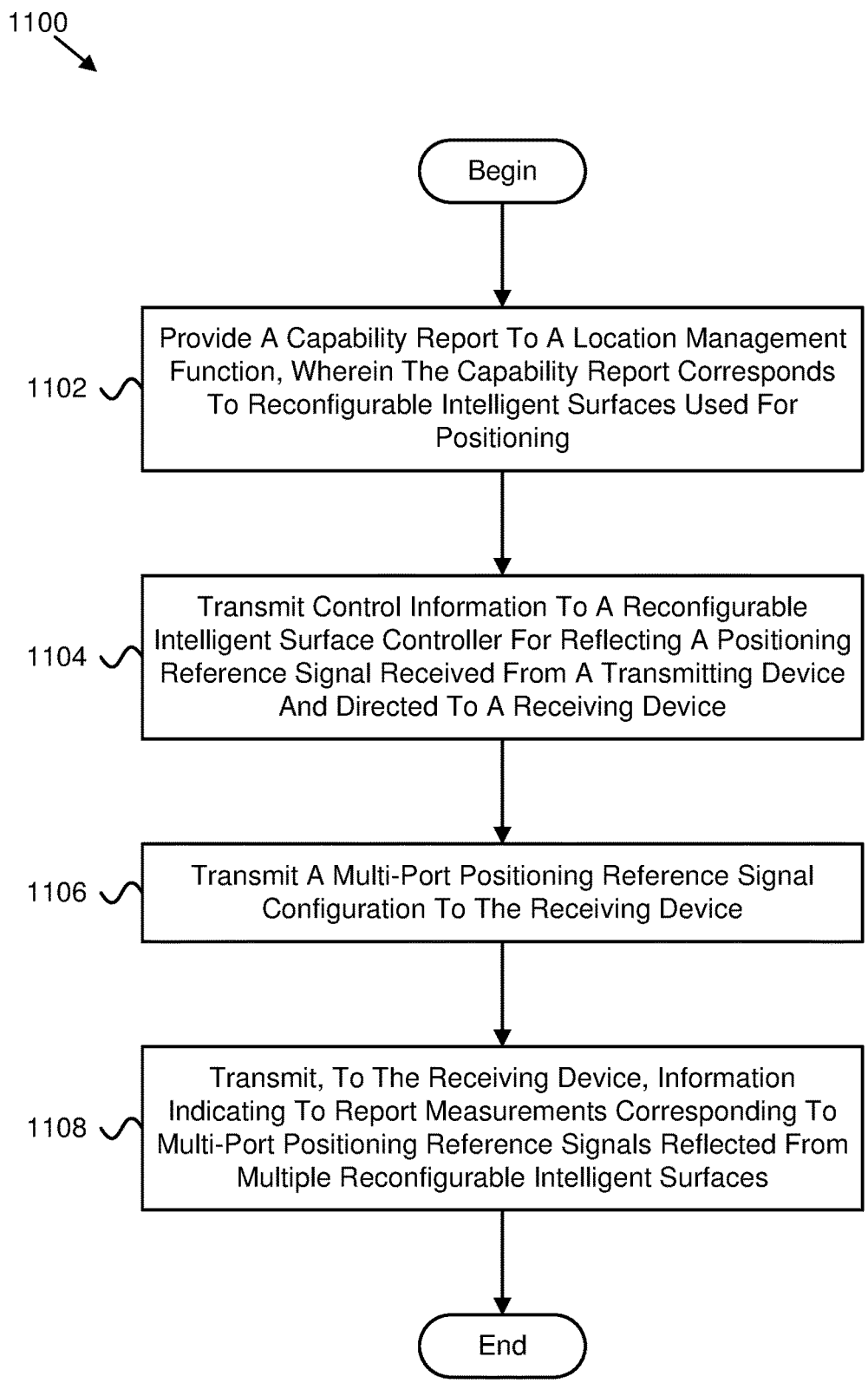
FIG. 11 is a flow chart diagram illustrating one embodiment of a method for configuration corresponding to a reconfigurable intelligent surface controller.

FIG. 11 is a flow chart diagram illustrating one embodiment of a method 1100 for configuration corresponding to a reconfigurable intelligent surface controller. In some embodiments, the method 1100 is performed by an apparatus, such as the network unit 104. In certain embodiments, the method 1100 may be performed by a processor executing program code, for example, a microcontroller, a microprocessor, a CPU, a GPU, an auxiliary processing unit, a FPGA, or the like.

In various embodiments, the method 1100 includes providing 1102, from a network node, a capability report to a location management function. The capability report corresponds to reconfigurable intelligent surfaces used for positioning. In some embodiments, the method 1100 includes transmitting 1104 control information to a reconfigurable intelligent surface controller for reflecting a positioning reference signal received from a transmitting device and directed to a receiving device. In certain embodiments, the method 1100 includes transmitting 1106 a multi-port positioning reference signal configuration to the receiving device. In various embodiments, the method 1100 includes transmitting 1108, to the receiving device, information indicating to report measurements corresponding to multi-port positioning reference signals reflected from multiple reconfigurable intelligent surfaces.

In certain embodiments, the control information for the reconfigurable intelligent surface comprises a time domain allocation of symbols, slots, or a combination thereof configured to carry positioning reference signal information and positioning spatial information for beamforming the reflected positioning reference signal with a determined angle of departure. In some embodiments, the method 1100 further comprises allocating the multi-port positioning reference signal to a configured time and frequency grid based on a positioning reference signal resource set identifier of a plurality of reconfigurable intelligent surface identifiers and applying a spatial filter for each port of a plurality of ports to beamform a signal corresponding to the positioning reference signal resource set identifier to a corresponding reconfigurable intelligent surface.

In various embodiments, the method 1100 further comprises transmitting the multi-port positioning reference signal configuration with different frequency offsets corresponding to different reconfigurable intelligent surfaces to the receiving device, and indicating to the receiving device to report a measurement corresponding to a positioning reference signal associated with each reconfigurable intelligent surface identifier of a plurality of reconfigurable intelligent surface identifiers. In one embodiment, the method 1100 further comprises transmitting, to the receiving device, a location management function configuration of the multi-port positioning reference signal, wherein the location management function configuration comprises a time domain allocation of different positioning reference signals corresponding to different antenna ports, and positioning reference signal symbols, positioning slots, or a combination thereof are grouped and associated with different positioning reference signal ports.

In certain embodiments, the method 1100 further comprises transmitting, to the receiving device, information indicating a positioning reference signal periodicity for each positioning reference signal port of a plurality of positioning reference signal ports and indicating to report a positioning reference signal measurement. In some embodiments, the capability report comprises a recommendation for a positioning reference signal configuration. In various embodiments, the capability report comprises information indicating reconfigurable intelligent surfaces involved in positioning, a number of reconfigurable intelligent surfaces, a number of segments of each reconfigurable intelligent surface of the number of reconfigurable intelligent surfaces, dimensions of each reconfigurable intelligent surface of the number of reconfigurable intelligent surfaces, and a location of each reconfigurable intelligent surface of the number of reconfigurable intelligent surfaces.

In one embodiment, the method 1100 further comprises configuring a reconfigurable intelligent surface to apply beam sweeping of a single port positioning reference signal such that positioning reference signal symbols in a slot are grouped and different spatial information is applied by the reconfigurable intelligent surface controller to direct beams to different directions. In certain embodiments, the method 1100 further comprises reporting, to the location management function, a location calculation based on a report from the receiving device corresponding to multiple positioning reference signal identifiers for multiple reconfigurable intelligent surfaces. In some embodiments, the method 1100 further comprises receiving a measurement report for a reconfigurable intelligent surface regarding a sounding reference signal measurement from the receiving device for uplink positioning.

Figure 12:
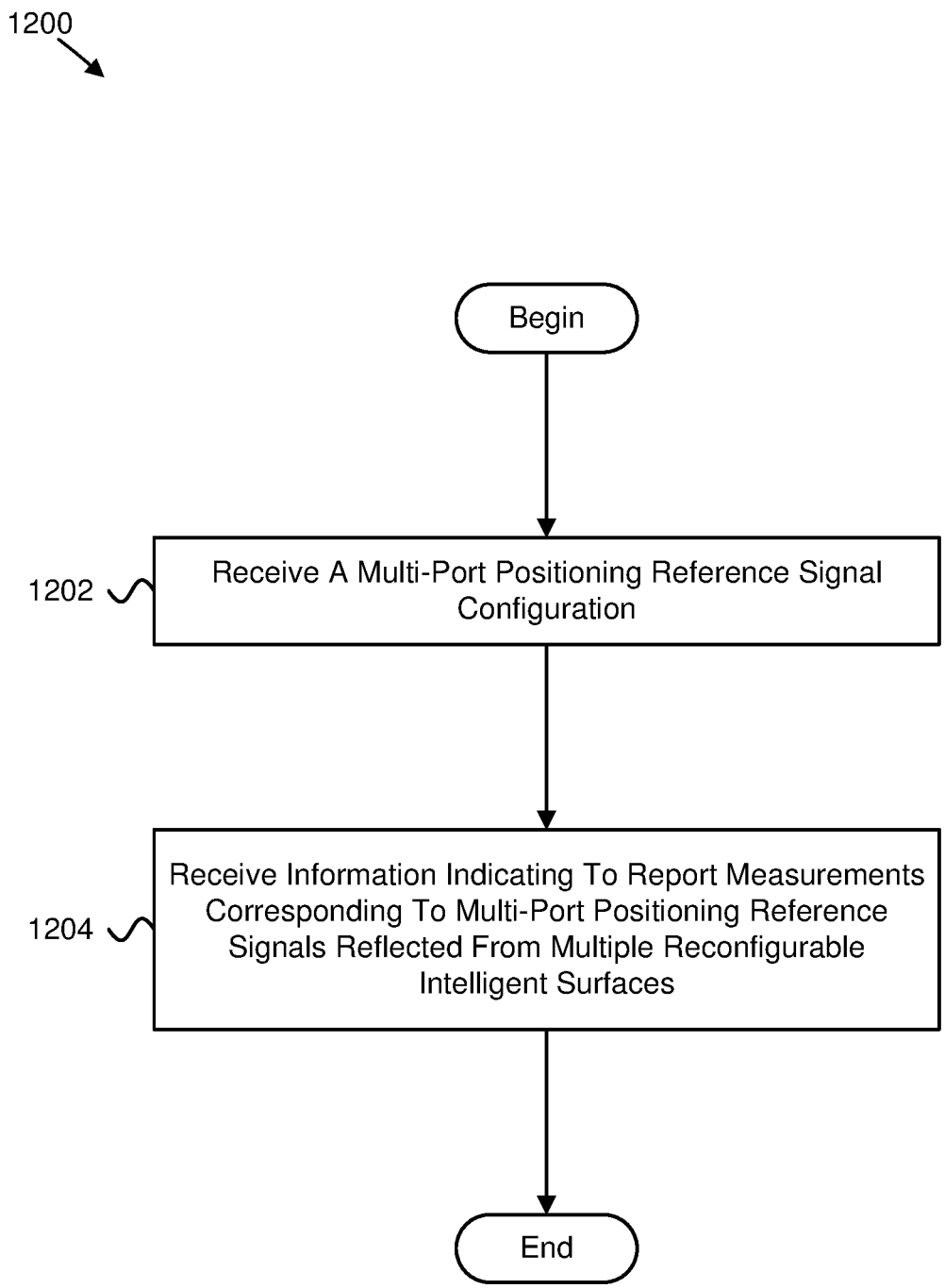
FIG. 12 is a flow chart diagram illustrating another embodiment of a method for configuration corresponding to a reconfigurable intelligent surface controller.

FIG. 12 is a flow chart diagram illustrating another embodiment of a method 1200 for configuration corresponding to a reconfigurable intelligent surface controller. In some embodiments, the method 1200 is performed by an apparatus, such as the remote unit 102 and/or the network unit 104. In certain embodiments, the method 1200 may be performed by a processor executing program code, for example, a microcontroller, a microprocessor, a CPU, a GPU, an auxiliary processing unit, a FPGA, or the like.

In various embodiments, the method 1200 includes receiving 1202, at a receiving device, a multi-port positioning reference signal configuration. In some embodiments, the method 1200 includes receiving 1204 information indicating to report measurements corresponding to multi-port positioning reference signals reflected from multiple reconfigurable intelligent surfaces.

In certain embodiments, the method 1200 further comprises receiving the multi-port positioning reference signal configuration with different frequency offsets, and receiving information indicating to report a measurement corresponding to a positioning reference signal associated with each reconfigurable intelligent surface identifier of a plurality of reconfigurable intelligent surface identifiers. In some embodiments, the method 1200 further comprises receiving a location management function configuration of a multi-port positioning reference signal, wherein the location management function configuration comprises a time domain allocation of different positioning reference signals corresponding to different antenna ports, and positioning reference signal symbols, positioning slots, or a combination thereof are grouped and associated with different positioning reference signal ports.

In various embodiments, the method 1200 further comprises receiving information indicating a positioning reference signal periodicity for each positioning reference signal port of a plurality of positioning reference signal ports and receiving information indicating to report a positioning reference signal measurement. In one embodiment, the method 1200 further comprises transmitting a measurement report for a reconfigurable intelligent surface regarding a sounding reference signal measurement from the receiving device for uplink positioning.

In certain embodiments, the method 1200 further comprises receiving, from a location management function, a configuration of a multi-port positioning reference signal to be measured for each base station of a plurality of base stations. In some embodiments, the method 1200 further comprises transmitting a positioning reference signal measurement for multiple reconfigurable intelligent surfaces, multiple reconfigurable intelligent surface segments, or a combination thereof to a location management function. In various embodiments, the method 1200 further comprises reporting a measurement, a beam quality, or a combination thereof to a base station for each group of symbols, each group of slots, or a combination thereof associated with different reconfigurable intelligent surfaces.

Figure 13:
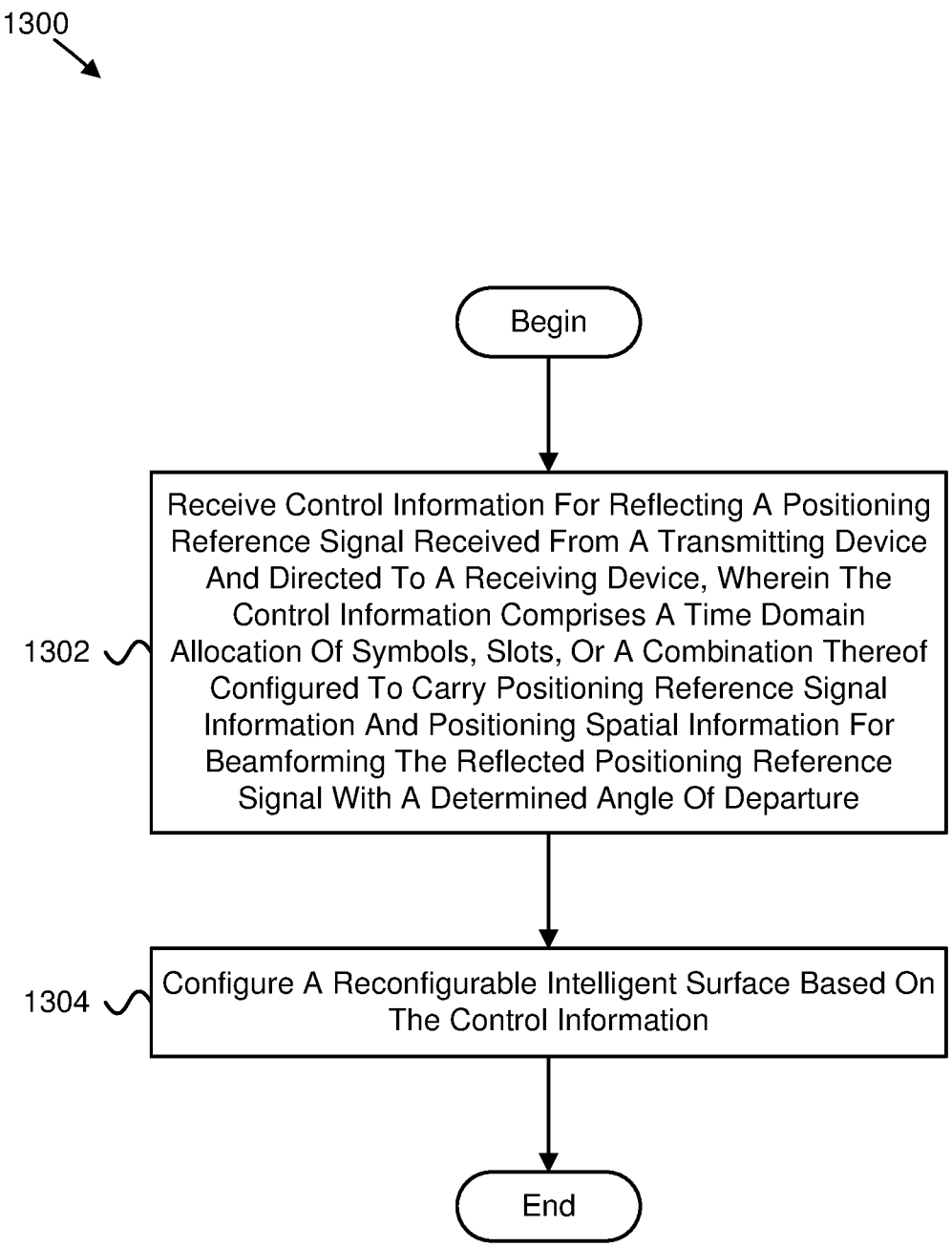
FIG. 13 is a flow chart diagram illustrating a further embodiment of a method for configuration corresponding to a reconfigurable intelligent surface controller.

FIG. 13 is a flow chart diagram illustrating a further embodiment of a method 1300 for configuration corresponding to a reconfigurable intelligent surface controller. In some embodiments, the method 1300 is performed by an apparatus, such as the network unit 104. In certain embodiments, the method 1300 may be performed by a processor executing program code, for example, a microcontroller, a microprocessor, a CPU, a GPU, an auxiliary processing unit, a FPGA, or the like.

In various embodiments, the method 1300 includes receiving 1302, at a reconfigurable intelligent surface controller, control information for reflecting a positioning reference signal received from a transmitting device and directed to a receiving device. The control information includes a time domain allocation of symbols, slots, or a combination thereof configured to carry positioning reference signal information and positioning spatial information for beamforming the reflected positioning reference signal with a determined angle of departure. In some embodiments, the method 1300 includes configuring 1304 a reconfigurable intelligent surface based on the control information.

In certain embodiments, the method 1300 further comprises configuring the reconfigurable intelligent surface to apply beam sweeping of a single port positioning reference signal such that positioning reference signal symbols in a slot are grouped and different spatial information is applied by the reconfigurable intelligent surface controller to direct beams to different directions.

In one embodiment, a method of a network node comprises: providing a capability report to a location management function, wherein the capability report corresponds to reconfigurable intelligent surfaces used for positioning; transmitting control information to a reconfigurable intelligent surface controller for reflecting a positioning reference signal received from a transmitting device and directed to a receiving device; transmitting a multi-port positioning reference signal configuration to the receiving device; and transmitting, to the receiving device, information indicating to report measurements corresponding to multi-port positioning reference signals reflected from multiple reconfigurable intelligent surfaces.

In certain embodiments, the control information for the reconfigurable intelligent surface comprises a time domain allocation of symbols, slots, or a combination thereof configured to carry positioning reference signal information and positioning spatial information for beamforming the reflected positioning reference signal with a determined angle of departure.

In some embodiments, the method further comprises allocating the multi-port positioning reference signal to a configured time and frequency grid based on a positioning reference signal resource set identifier of a plurality of reconfigurable intelligent surface identifiers and applying a spatial filter for each port of a plurality of ports to beamform a signal corresponding to the positioning reference signal resource set identifier to a corresponding reconfigurable intelligent surface.

In various embodiments, the method further comprises transmitting the multi-port positioning reference signal configuration with different frequency offsets corresponding to different reconfigurable intelligent surfaces to the receiving device, and indicating to the receiving device to report a measurement corresponding to a positioning reference signal associated with each reconfigurable intelligent surface identifier of a plurality of reconfigurable intelligent surface identifiers.

In one embodiment, the method further comprises transmitting, to the receiving device, a location management function configuration of the multi-port positioning reference signal, wherein the location management function configuration comprises a time domain allocation of different positioning reference signals corresponding to different antenna ports, and positioning reference signal symbols, positioning slots, or a combination thereof are grouped and associated with different positioning reference signal ports.

In certain embodiments, the method further comprises transmitting, to the receiving device, information indicating a positioning reference signal periodicity for each positioning reference signal port of a plurality of positioning reference signal ports and indicating to report a positioning reference signal measurement.

In some embodiments, the capability report comprises a recommendation for a positioning reference signal configuration.

In various embodiments, the capability report comprises information indicating reconfigurable intelligent surfaces involved in positioning, a number of reconfigurable intelligent surfaces, a number of segments of each reconfigurable intelligent surface of the number of reconfigurable intelligent surfaces, dimensions of each reconfigurable intelligent surface of the number of reconfigurable intelligent surfaces, and a location of each reconfigurable intelligent surface of the number of reconfigurable intelligent surfaces.

In one embodiment, the method further comprises configuring a reconfigurable intelligent surface to apply beam sweeping of a single port positioning reference signal such that positioning reference signal symbols in a slot are grouped and different spatial information is applied by the reconfigurable intelligent surface controller to direct beams to different directions.

In certain embodiments, the method further comprises reporting, to the location management function, a location calculation based on a report from the receiving device corresponding to multiple positioning reference signal identifiers for multiple reconfigurable intelligent surfaces.

In some embodiments, the method further comprises receiving a measurement report for a reconfigurable intelligent surface regarding a sounding reference signal measurement from the receiving device for uplink positioning.

In one embodiment, an apparatus comprises a network node. The apparatus further comprises: a transmitter that: provides a capability report to a location management function, wherein the capability report corresponds to reconfigurable intelligent surfaces used for positioning; transmits control information to a reconfigurable intelligent surface controller for reflecting a positioning reference signal received from a transmitting device and directed to a receiving device; transmits a multi-port positioning reference signal configuration to the receiving device; and transmits, to the receiving device, information indicating to report measurements corresponding to multi-port positioning reference signals reflected from multiple reconfigurable intelligent surfaces.

In certain embodiments, the control information for the reconfigurable intelligent surface comprises a time domain allocation of symbols, slots, or a combination thereof configured to carry positioning reference signal information and positioning spatial information for beamforming the reflected positioning reference signal with a determined angle of departure.

In some embodiments, the apparatus further comprises a processor that allocates the multi-port positioning reference signal to a configured time and frequency grid based on a positioning reference signal resource set identifier of a plurality of reconfigurable intelligent surface identifiers and applies a spatial filter for each port of a plurality of ports to beamform a signal corresponding to the positioning reference signal resource set identifier to a corresponding reconfigurable intelligent surface.

In various embodiments, the transmitter transmits the multi-port positioning reference signal configuration with different frequency offsets corresponding to different reconfigurable intelligent surfaces to the receiving device, and indicates to the receiving device to report a measurement corresponding to a positioning reference signal associated with each reconfigurable intelligent surface identifier of a plurality of reconfigurable intelligent surface identifiers.

In one embodiment, the transmitter transmits, to the receiving device, a location management function configuration of the multi-port positioning reference signal, and the location management function configuration comprises a time domain allocation of different positioning reference signals corresponding to different antenna ports, and positioning reference signal symbols, positioning slots, or a combination thereof are grouped and associated with different positioning reference signal ports.

In certain embodiments, the transmitter transmits, to the receiving device, information indicating a positioning reference signal periodicity for each positioning reference signal port of a plurality of positioning reference signal ports and indicating to report a positioning reference signal measurement.

In some embodiments, the capability report comprises a recommendation for a positioning reference signal configuration.

In various embodiments, the capability report comprises information indicating reconfigurable intelligent surfaces involved in positioning, a number of reconfigurable intelligent surfaces, a number of segments of each reconfigurable intelligent surface of the number of reconfigurable intelligent surfaces, dimensions of each reconfigurable intelligent surface of the number of reconfigurable intelligent surfaces, and a location of each reconfigurable intelligent surface of the number of reconfigurable intelligent surfaces.

In one embodiment, the apparatus further comprises a processor that configures a reconfigurable intelligent surface to apply beam sweeping of a single port positioning reference signal such that positioning reference signal symbols in a slot are grouped and different spatial information is applied by the reconfigurable intelligent surface controller to direct beams to different directions.

In certain embodiments, the transmitter reports, to the location management function, a location calculation based on a report from the receiving device corresponding to multiple positioning reference signal identifiers for multiple reconfigurable intelligent surfaces.

In some embodiments, the apparatus further comprises a receiver that receives a measurement report for a reconfigurable intelligent surface regarding a sounding reference signal measurement from the receiving device for uplink positioning.

In one embodiment, a method of a receiving device comprises: receiving a multi-port positioning reference signal configuration; and receiving information indicating to report measurements corresponding to multi-port positioning reference signals reflected from multiple reconfigurable intelligent surfaces.

In certain embodiments, the method further comprises receiving the multi-port positioning reference signal configuration with different frequency offsets, and receiving information indicating to report a measurement corresponding to a positioning reference signal associated with each reconfigurable intelligent surface identifier of a plurality of reconfigurable intelligent surface identifiers.

In some embodiments, the method further comprises receiving a location management function configuration of a multi-port positioning reference signal, wherein the location management function configuration comprises a time domain allocation of different positioning reference signals corresponding to different antenna ports, and positioning reference signal symbols, positioning slots, or a combination thereof are grouped and associated with different positioning reference signal ports.

In various embodiments, the method further comprises receiving information indicating a positioning reference signal periodicity for each positioning reference signal port of a plurality of positioning reference signal ports and receiving information indicating to report a positioning reference signal measurement.

In one embodiment, the method further comprises transmitting a measurement report for a reconfigurable intelligent surface regarding a sounding reference signal measurement from the receiving device for uplink positioning.

In certain embodiments, the method further comprises receiving, from a location management function, a configuration of a multi-port positioning reference signal to be measured for each base station of a plurality of base stations.

In some embodiments, the method further comprises transmitting a positioning reference signal measurement for multiple reconfigurable intelligent surfaces, multiple reconfigurable intelligent surface segments, or a combination thereof to a location management function.

In various embodiments, the method further comprises reporting a measurement, a beam quality, or a combination thereof to a base station for each group of symbols, each group of slots, or a combination thereof associated with different reconfigurable intelligent surfaces.

In one embodiment, an apparatus comprises a receiving device. The apparatus further comprises: a receiver that: receives a multi-port positioning reference signal configuration; and receives information indicating to report measurements corresponding to multi-port positioning reference signals reflected from multiple reconfigurable intelligent surfaces.

In certain embodiments, the receiver receives the multi-port positioning reference signal configuration with different frequency offsets, and receiving information indicating to report a measurement corresponding to a positioning reference signal associated with each reconfigurable intelligent surface identifier of a plurality of reconfigurable intelligent surface identifiers.

In some embodiments, the receiver receives a location management function configuration of a multi-port positioning reference signal, and the location management function configuration comprises a time domain allocation of different positioning reference signals corresponding to different antenna ports, and positioning reference signal symbols, positioning slots, or a combination thereof are grouped and associated with different positioning reference signal ports.

In various embodiments, the receiver receives information indicating a positioning reference signal periodicity for each positioning reference signal port of a plurality of positioning reference signal ports and receiving information indicating to report a positioning reference signal measurement.

In one embodiment, the apparatus further comprises a transmitter that transmits a measurement report for a reconfigurable intelligent surface regarding a sounding reference signal measurement from the receiving device for uplink positioning.

In certain embodiments, the receiver receives, from a location management function, a configuration of a multi-port positioning reference signal to be measured for each base station of a plurality of base stations.

In some embodiments, the apparatus further comprises a transmitter that transmits a positioning reference signal measurement for multiple reconfigurable intelligent surfaces, multiple reconfigurable intelligent surface segments, or a combination thereof to a location management function.

In various embodiments, the receiver receives a measurement, a beam quality, or a combination thereof to a base station for each group of symbols, each group of slots, or a combination thereof associated with different reconfigurable intelligent surfaces.

In one embodiment, a method of a reconfigurable intelligent surface controller comprises: receiving control information for reflecting a positioning reference signal received from a transmitting device and directed to a receiving device, wherein the control information comprises a time domain allocation of symbols, slots, or a combination thereof configured to carry positioning reference signal information and positioning spatial information for beamforming the reflected positioning reference signal with a determined angle of departure; and configuring a reconfigurable intelligent surface based on the control information.

In certain embodiments, the method further comprises configuring the reconfigurable intelligent surface to apply beam sweeping of a single port positioning reference signal such that positioning reference signal symbols in a slot are grouped and different spatial information is applied by the reconfigurable intelligent surface controller to direct beams to different directions.

In one embodiment, an apparatus comprises a reconfigurable intelligent surface controller. The apparatus further comprises: a receiver that receives control information for reflecting a positioning reference signal received from a transmitting device and directed to a receiving device, wherein the control information comprises a time domain allocation of symbols, slots, or a combination thereof configured to carry positioning reference signal information and positioning spatial information for beamforming the reflected positioning reference signal with a determined angle of departure; and a processor that configures a reconfigurable intelligent surface based on the control information.

In certain embodiments, the processor configures the reconfigurable intelligent surface to apply beam sweeping of a single port positioning reference signal such that positioning reference signal symbols in a slot are grouped and different spatial information is applied by the reconfigurable intelligent surface controller to direct beams to different directions.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A network node, comprising:
   at least one memory; and
   at least one processor coupled with the at least one memory and configured to cause the network node to:
      provide a capability report to a location management function (LMF), wherein the capability report corresponds to reconfigurable intelligent surfaces (RISs) used for positioning;
      transmit control information to a RIS controller for reflecting a positioning reference signal received from a transmitting device and directed to a receiving device;
      transmit a multi-port positioning reference signal configuration to the receiving device; and
      transmit, to the receiving device, information indicating to report measurements corresponding to multi-port positioning reference signals reflected from multiple RISs.

2. The network node of claim 1, wherein the control information for the RIS controller comprises a time domain (TD) allocation for transmission of positioning reference signal information and positioning spatial information for beamforming the reflected positioning reference signal according to an angle of departure.

3. The network node of claim 1, wherein the at least one processor is further configured to cause the network node to:
   allocate the multi-port positioning reference signal to a configured resource grid based on a positioning reference signal resource set identifier of a plurality of RIS identifiers; and
   apply a spatial filter for each port of a plurality of ports to beamform a signal corresponding to the positioning reference signal resource set identifier to a corresponding RIS.

4. The network node of claim 1, wherein the at least one processor is further configured to cause the network node to:
   transmit, to the receiving device, the multi-port positioning reference signal configuration with different frequency offsets corresponding to different RIS ; and
   indicate to the receiving device to report a measurement corresponding to a positioning reference signal associated with each RIS identifier of a plurality of RIS identifiers.

5. The network node of claim 1, wherein the at least one processor is further configured to cause the network node to transmit, to the receiving device, an LMF configuration of the multi-port positioning reference signal, wherein the LMF configuration comprises a time domain (TD) allocation of different positioning reference signals corresponding to different antenna ports, and wherein positioning reference signal symbols, positioning slots, or a combination thereof are grouped and associated with different positioning reference signal ports.

6. The network node of claim 1, wherein the at least one processor is further configured to cause the network node to transmit, to the receiving device, information indicating a positioning reference signal periodicity for each positioning reference signal port of a plurality of positioning reference signal ports, wherein the information further indicates to report a positioning reference signal measurement.

7. The network node of claim 1, wherein the capability report comprises a recommendation for a positioning reference signal configuration.

8. The network node of claim 1, wherein the capability report comprises information indicating one or more RIS involved in positioning, a number of RIS, a number of segments of each RIS of the number of RIS, dimensions of each RIS of the number of RIS, and a location of each RIS of the number of RIS.

9. The network node of claim 1, wherein the at least one processor is further configured to cause the network node to configure a RIS to apply beam sweeping of a single port positioning reference signal such that positioning reference signal symbols in a slot are grouped and different spatial information is applied by the RIS controller to direct beams to different directions.

10. The network node of claim 1, wherein the at least one processor is further configured to cause the network node to transmit, to the LMF, a location calculation based on a report from the receiving device corresponding to multiple positioning reference signal identifiers for multiple RIS.

11. The network node of claim 1, wherein the at least one processor is further configured to cause the network node to receive a measurement report for a RIS regarding a sounding reference signal (SRS) measurement from the receiving device for uplink positioning.

12. A receiving device, comprising:
- at least one memory; and
- at least one processor coupled with the at least one memory and configured to cause the receiving device to:
  - receive a multi-port positioning reference signal configuration from a network node, wherein the multi-port positioning reference signal configuration has different frequency offsets; and
  - receive information indicating to report measurements corresponding to multi-port positioning reference signals reflected from multiple reconfigurable intelligent surfaces, wherein each positioning reference signal of the multi-port positioning reference signals is associated with a reconfigurable intelligent surface (RIS) identifier of a plurality of RIS identifiers, and each RIS identifier of the plurality of RIS identifiers is associated with a RIS element of a plurality of RIS elements of a RIS device.

13. The receiving device of claim 12, wherein the at least one processor is configured to cause the receiving device to receive the multi-port positioning reference signal configuration with different frequency offsets, and receive information indicating to report a measurement corresponding to a positioning reference signal associated with each RIS identifier of a plurality of RIS identifiers.

14. The receiving device of claim 12, wherein the at least one processor is configured to cause the receiving device to receive a location management function (LMF) configuration of a multi-port positioning reference signal, and the LMF configuration comprises a time domain (TD) allocation of different positioning reference signals corresponding to different antenna ports, and positioning reference signal symbols, positioning slots, or a combination thereof are grouped and associated with different positioning reference signal ports.

15. The receiving device of claim 12, wherein the at least one processor is configured to cause the receiving device to receive information indicating a positioning reference signal periodicity for each positioning reference signal port of a plurality of positioning reference signal ports and receive information indicating to report a positioning reference signal measurement.

16. The receiving device of claim 12, wherein the at least one processor is configured to cause the receiving device to transmit a measurement report for a RIS regarding a sounding reference signal (RSR) measurement from the receiving device for uplink positioning.

17. The receiving device of claim 12, wherein the at least one processor is configured to cause the receiving device to transmit a positioning reference signal measurement for multiple RISs, multiple RIS segments, or a combination thereof to a location management function (LMF).

18. The receiving device of claim 12, wherein the at least one processor is configured to cause the receiving device to receive a measurement, a beam quality, or a combination thereof from a base station for each group of symbols, each group of slots, or a combination thereof associated with different RISs.

19. A reconfigurable intelligent surface (RIS) controller, comprising:
- at least one memory; and
- at least one processor coupled with the at least one memory and configured to cause the RIS controller to:
  - receive control information for reflecting a positioning reference signal received from a transmitting device and directed to a receiving device, wherein the control information comprises a time domain (TD) allocation of symbols, slots, or a combination thereof configured to carry positioning reference signal information and positioning spatial information for beamforming the reflected positioning reference signal with a determined angle of departure; and
  - configure a RIS based on the control information, wherein each RIS element of a plurality of RIS elements of the RIS is separately configured.

20. The RIS controller of claim 19, wherein the at least one processor is configured to cause the RIS controller to configure the RIS to apply beam sweeping of a single port positioning reference signal such that positioning reference signal symbols in a slot are grouped and different spatial information is applied by the RIS controller to direct beams to different directions.

* * * * *